United States Patent
Becchio et al.

(10) Patent No.: US 10,378,141 B2
(45) Date of Patent: Aug. 13, 2019

(54) SYSTEM FOR CONTROLLING A PLURALITY OF APPARATUSES OF A HOUSEHOLD APPLIANCE

(71) Applicant: ELBI INTERNATIONAL SPA, Turin (IT)

(72) Inventors: Marco Becchio, Carignano (IT); Luca Garetto, Rivoli (IT); Paolo Ravedati, Moncalieri (IT); Giorgio Carrer, Turin (IT); Ugo Gaino, Gabiano (IT); Ivan Fumagalli, Missaglia (IT)

(73) Assignee: ELBI INTERNATIONAL SPA, Turin (IT)

( * ) Notice: Subject to any disclaimer, the term of this patent is extended or adjusted under 35 U.S.C. 154(b) by 103 days.

(21) Appl. No.: 15/550,279

(22) PCT Filed: Feb. 10, 2016

(86) PCT No.: PCT/IB2016/050688
§ 371 (c)(1),
(2) Date: Aug. 10, 2017

(87) PCT Pub. No.: WO2016/128900
PCT Pub. Date: Aug. 18, 2016

(65) Prior Publication Data
US 2018/0023238 A1 Jan. 25, 2018

(30) Foreign Application Priority Data
Feb. 13, 2015 (IT) .............................. TO2015A0097

(51) Int. Cl.
*D06F 37/40* (2006.01)
*D06F 39/02* (2006.01)
(Continued)

(52) U.S. Cl.
CPC .......... *D06F 39/028* (2013.01); *D06F 39/022* (2013.01); *D06F 39/12* (2013.01);
(Continued)

(58) Field of Classification Search
CPC ...... H02P 1/00; H02P 5/46; H02P 1/24; H02P 6/00; H02P 1/46; H02P 6/0003;
(Continued)

(56) References Cited

U.S. PATENT DOCUMENTS

| | | | |
|---|---|---|---|
| 1,997,990 A * | 4/1935 | Adams .................... | D06F 37/30 192/129 R |
| 2,979,936 A | 4/1961 | Houser et al. | |
| 4,328,600 A * | 5/1982 | Bochan .................... | D06F 23/04 68/17 A |

FOREIGN PATENT DOCUMENTS

| | | | |
|---|---|---|---|
| EP | 2743393 A1 * | 6/2014 | ............. D06F 39/02 |
| EP | 2743393 A1 | 6/2014 | |

(Continued)

OTHER PUBLICATIONS

International Search Report and Written Opinion for corresponding International Patent Application No. PCT/IB2016/050688, dated May 9, 2016.

*Primary Examiner* — Anthony M Paul
(74) *Attorney, Agent, or Firm* — Merchant & Gould P.C.

(57) ABSTRACT

A control system includes a motor, first and second movable members, which can be rotated by the motor and which are adapted to interact with a first and a second controlled apparatus, respectively, and a transmission mechanism configured for controlling the movable members. The motor is bidirectional and is configured for selectively rotating, through the transmission mechanism, the first and second movable members, respectively, when the motor turns in a first direction and a second direction of rotation, respec- (Continued)

tively, opposite to each other. The transmission mechanism includes a first and a second unidirectional clutch selectively cooperating with the motor.

16 Claims, 11 Drawing Sheets

(51) Int. Cl.
*D06F 39/12* (2006.01)
*G05B 15/02* (2006.01)
*A47L 15/44* (2006.01)

(52) U.S. Cl.
CPC ............ *G05B 15/02* (2013.01); *A47L 15/449* (2013.01); *D06F 37/40* (2013.01)

(58) Field of Classification Search
CPC .. H02P 6/008; H02P 6/22; H02P 25/08; H02P 25/10; H02P 25/14; H02P 27/00; H02P 23/00; H02P 2007/0038; H02P 3/20; B60K 6/36; H02K 7/10
USPC .... 318/34, 37, 400.01, 400.02, 400.14, 256, 318/257, 280, 281, 700, 701, 727, 799, 318/715, 400.29, 721
See application file for complete search history.

(56) References Cited

FOREIGN PATENT DOCUMENTS

FR          2517375  A1    6/1983
GB           984210  A1    2/1965

\* cited by examiner

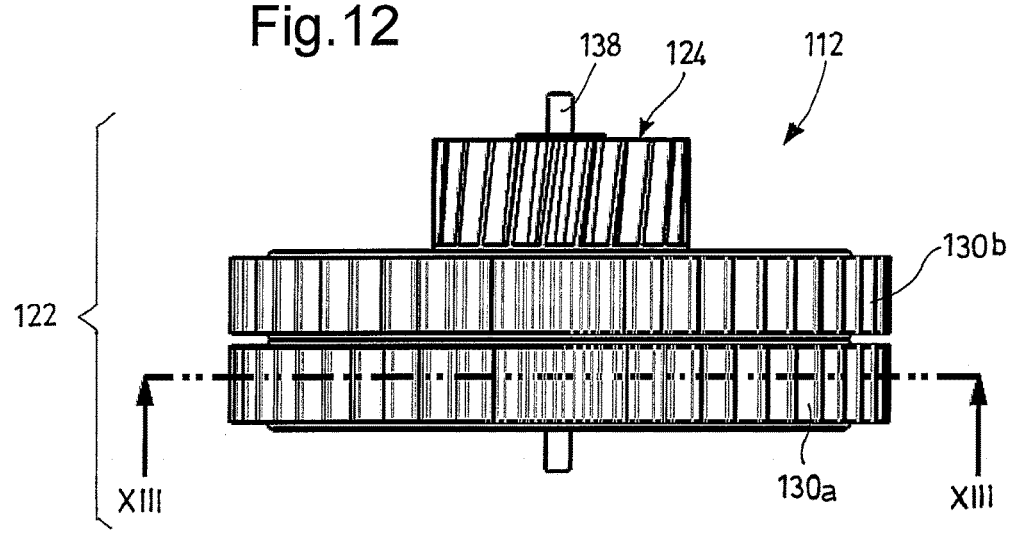
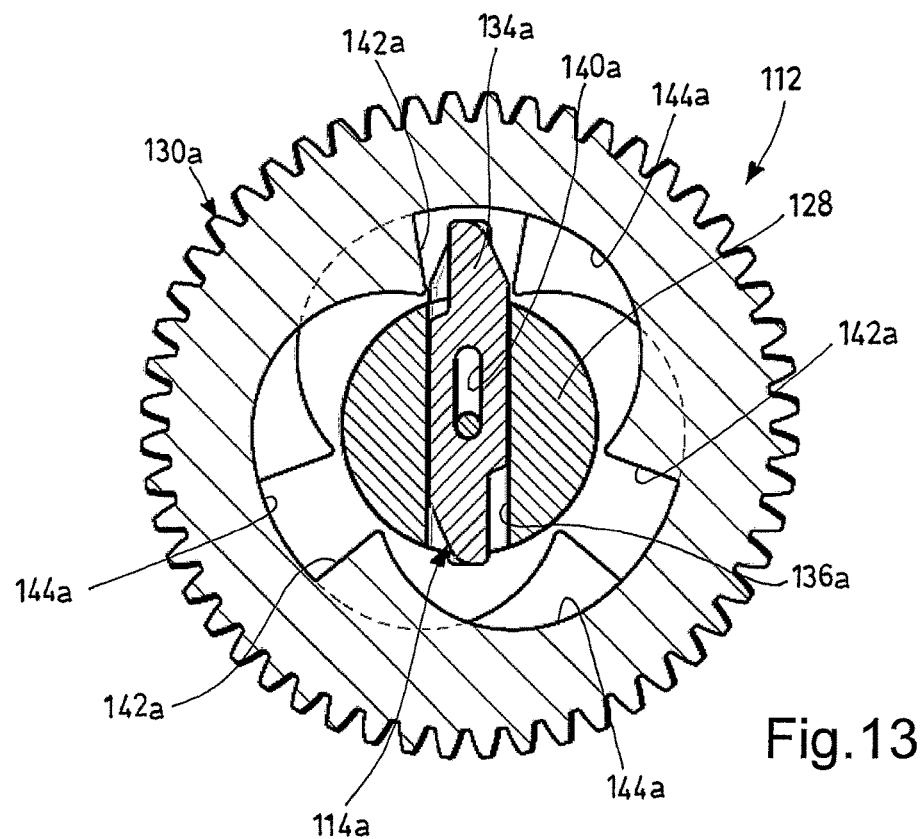

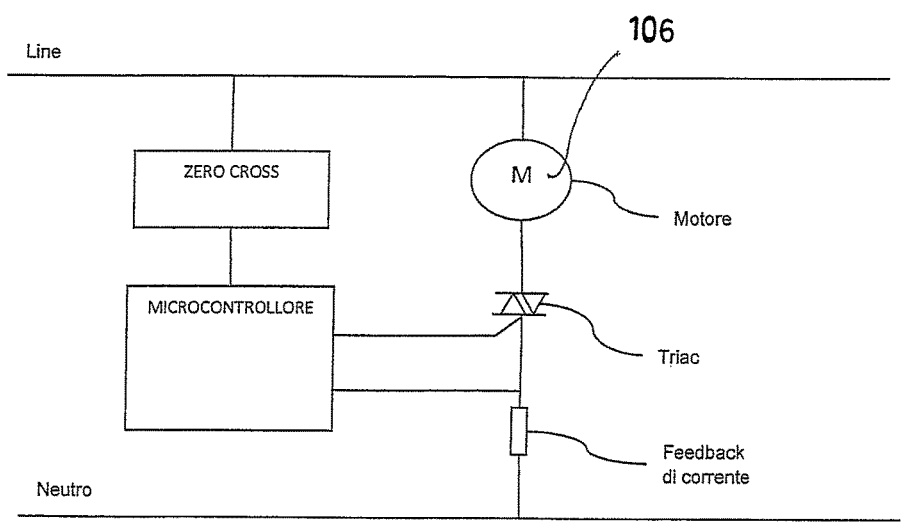
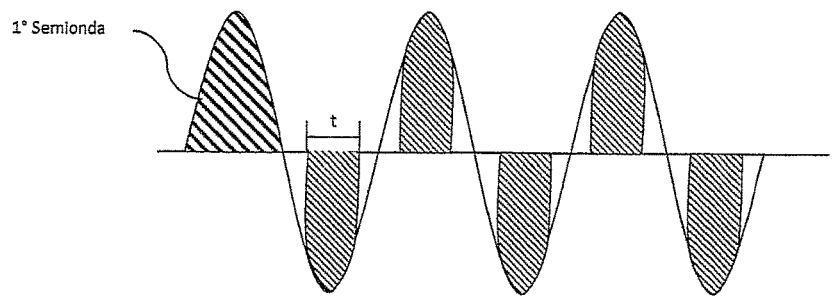
Fig.17

SYSTEM FOR CONTROLLING A PLURALITY OF APPARATUSES OF A HOUSEHOLD APPLIANCE

This application is a National Stage Application of International Patent Application No. PCT/IB2016/050688, filed 10 Feb. 2016, which claims benefit of Serial No. TO2015A000097, filed 13 Feb. 2015 in Italy and which applications are incorporated herein by reference. To the extent appropriate, a claim of priority is made to each of the above disclosed applications.

TECHNICAL FIELD

The present invention relates to a system for controlling a plurality of controlled apparatus, in particular in a household appliance.

BACKGROUND ART

In many fields—not only in the household appliance industry—it is often necessary to control two controlled apparatus by means of motors.

Generally such systems include a pair of motors separately acting upon the two external apparatus, which motors are typically controlled by an electronic control unit programmed for controlling the controlled apparatus according to predefined or user-selected modes of operation.

However, the systems known in the art suffer from a number of drawbacks.

SUMMARY OF THE INVENTION

It is one object of the present invention to provide a system for controlling a pair of controlled apparatus, wherein said system is improved over the prior art.

In particular, an advantage that can be achieved by implementing the present invention is to obtain a system as specified above, the control of which takes place through reliable mechanisms having a simplified structure.

Further features and advantages of the present invention will become apparent from the following detailed description, which is supplied by way of non-limiting example with particular reference to the annexed drawings, which will be summarized below.

BRIEF DESCRIPTION OF THE DRAWINGS

FIGS. 9 and 12 are, respectively, a plan view and a front elevation view of the components shown in FIG. 8, assembled together.

FIG. 13 is a sectional view, along the sectional line XIII-XIII, of the assembled components shown in FIG. 12.

FIGS. 16 and 17 are schematic views of two different exemplary electric circuit for controlling the system shown in the preceding figures.

DETAILED DESCRIPTION OF THE INVENTION

With reference to the annexed drawings, particularly to FIGS. 2 to 15, there is shown, designated as a whole as 100, a system for controlling a pair of controlled apparatus in accordance with an exemplary embodiment of the present invention.

By way of non-limiting example, system 100 is prearranged for controlling a metered and selective dispensation of a plurality of liquid agents by means of two pumps. However, in further variants of the present invention, the system may be used for performing other functions, e.g. outputting mechanical power towards two controlled apparatus, in a separately and independently controlled manner.

As will be explained more in detail in the following description, in the illustrated embodiment system 100 is associated with a household appliance, such as a washing machine.

However, as will become apparent to a man skilled in the art in the light of the following description, the present invention should not be understood to be applicable to household appliances only.

In the illustrated embodiment, system 100 has its components distributed between two reciprocally movable parts, in particular a movable part for supporting some components and elements of system 100 and a fixed part for supporting the other elements of system 100. However, according to alternative embodiments of the present invention, the system may also be so designed as to make no distinction or separation between such elements and components. In other words, the system may be implemented in a manner such that there are no components or elements which, when in use, are integrally movable together with the movable parts and other components or elements which are fixedly mounted on the fixed part.

In the illustrated embodiment, by way of example, said movable part comprises a drawer 10 of a washing machine, whereas said fixed part comprises a cabinet C of the washing machine.

Figure 1:
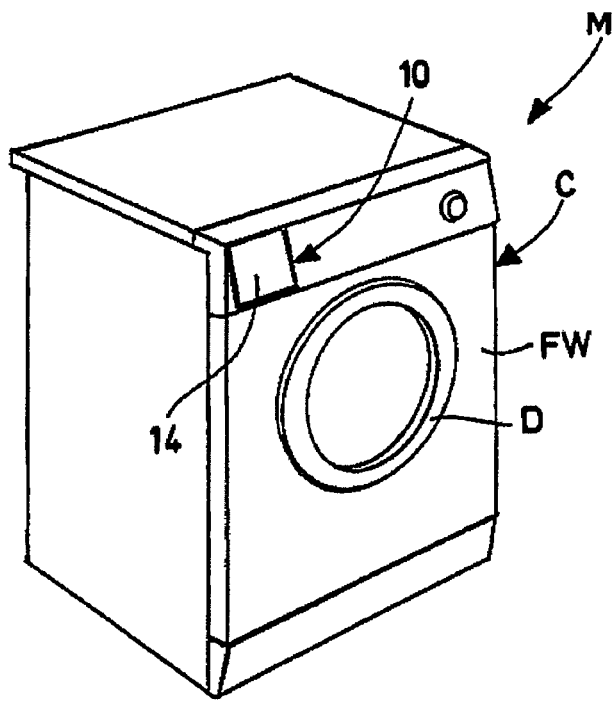
FIG. 1 is a schematic perspective view of a washing machine incorporating a drawer equipped with a system implemented in accordance with an exemplary and non-limiting embodiment of the present invention.
Figure 2:
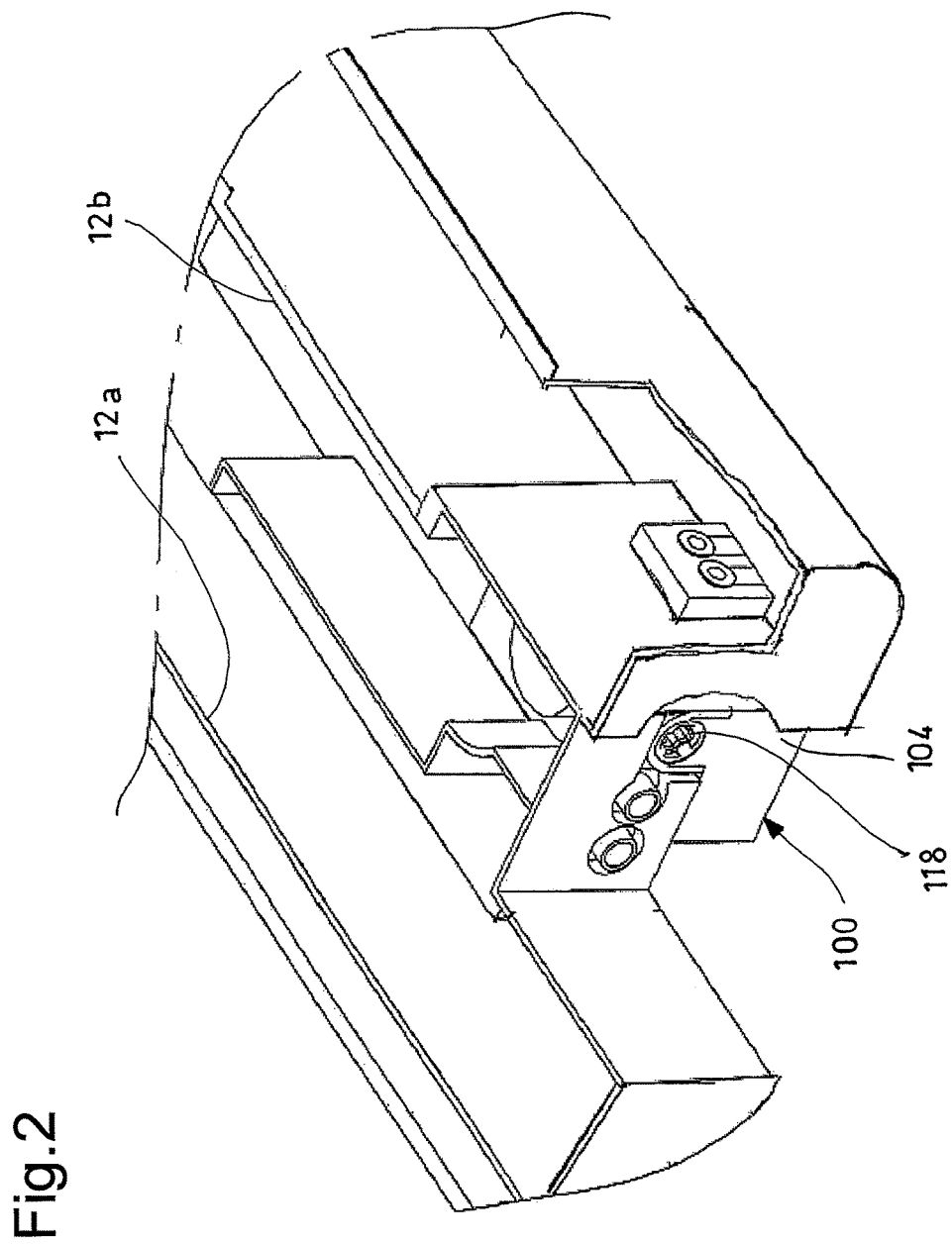
FIG. 2 is a perspective view of the drawer shown in the preceding figure, on which drawer a control assembly is visible, which belongs to the above-mentioned system.
Figure 3:
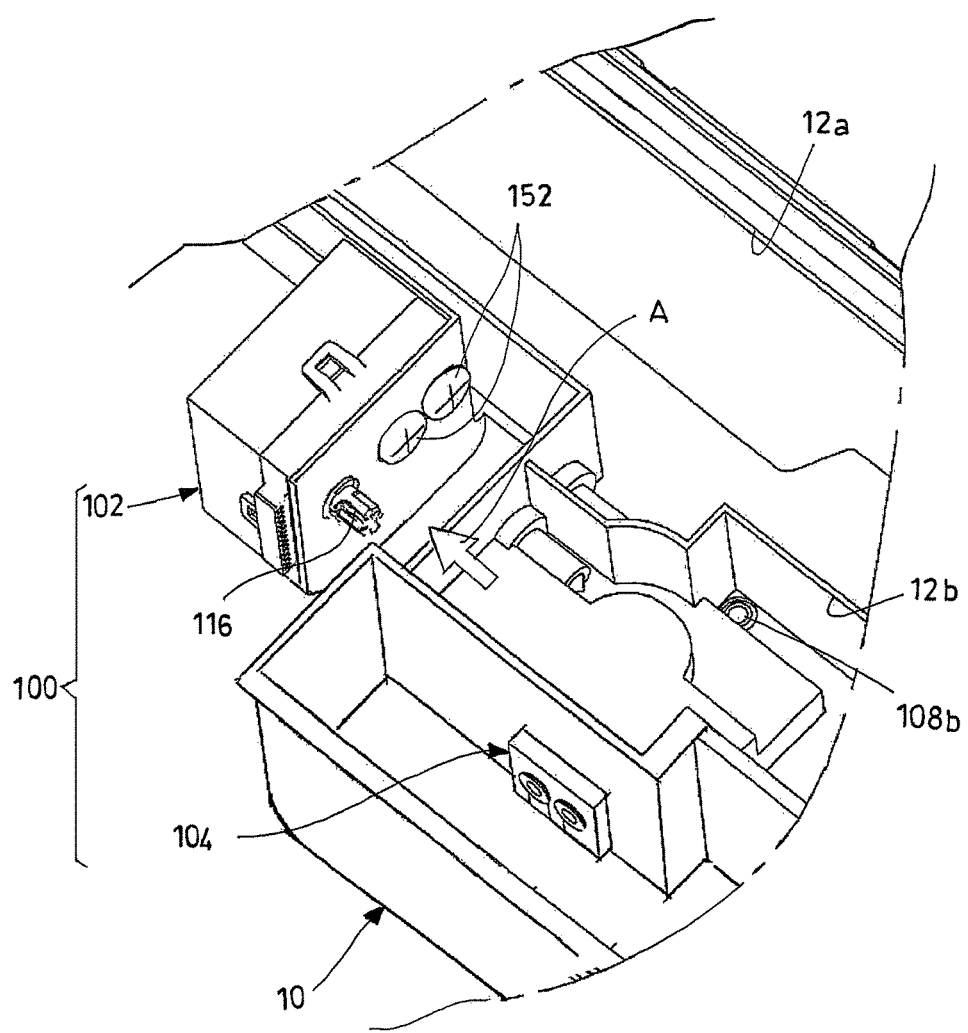
FIG. 3 is a further perspective view of the drawer shown in the preceding figures, which also shows the installation of an actuation device included in the above-mentioned system.
Figure 4:
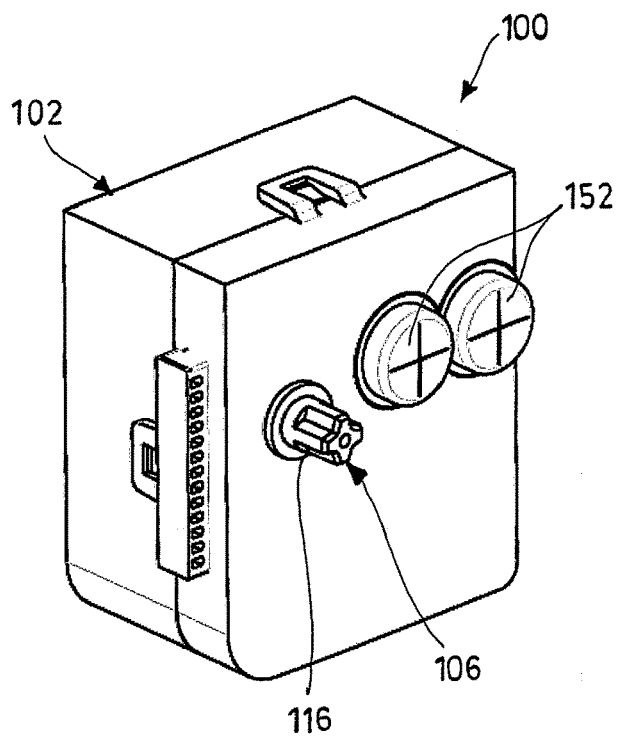
FIG. 4 is a perspective view of the actuation device shown in FIG. 3.
Figure 5:
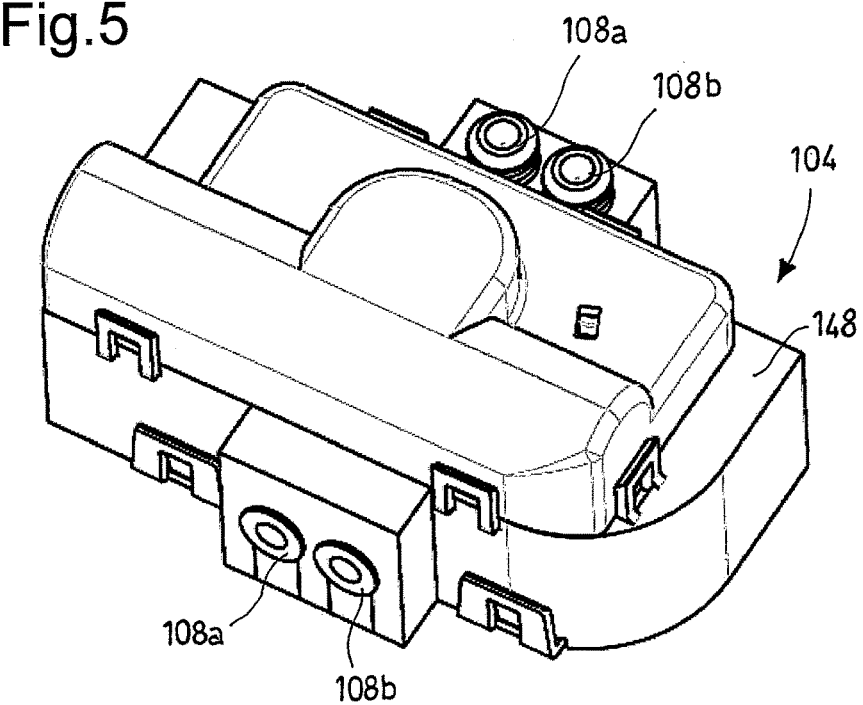
FIGS. 5 and 6 are perspective top and bottom views of the control assembly shown in the preceding figures.
Figure 6:
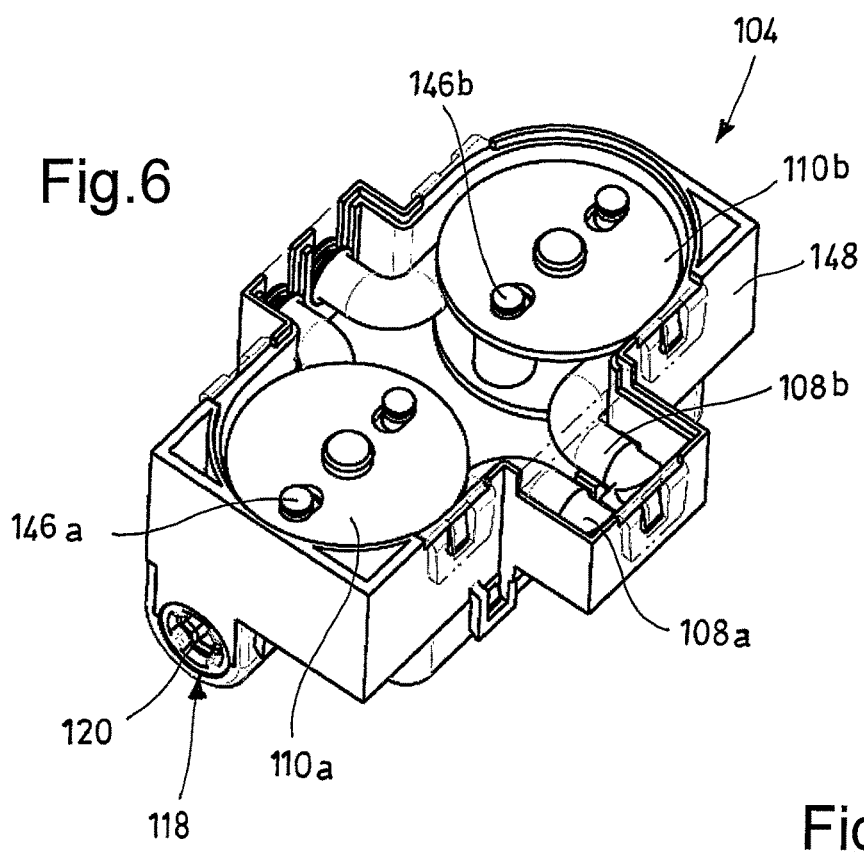
Figure 7:
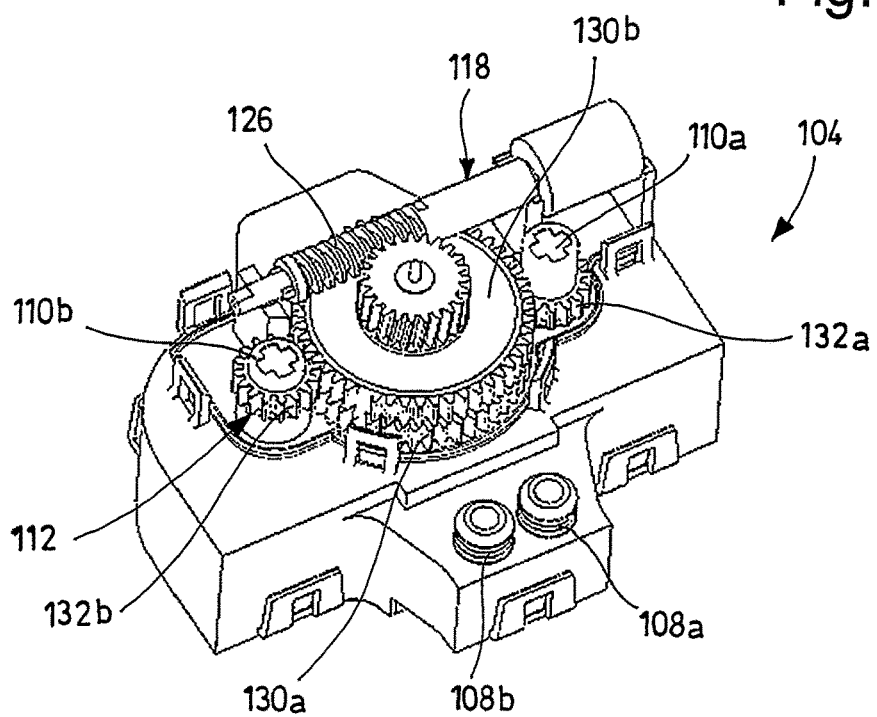
FIG. 7 is a perspective view of a transmission mechanism included in the control assembly shown in the preceding figures.
Figure 8:
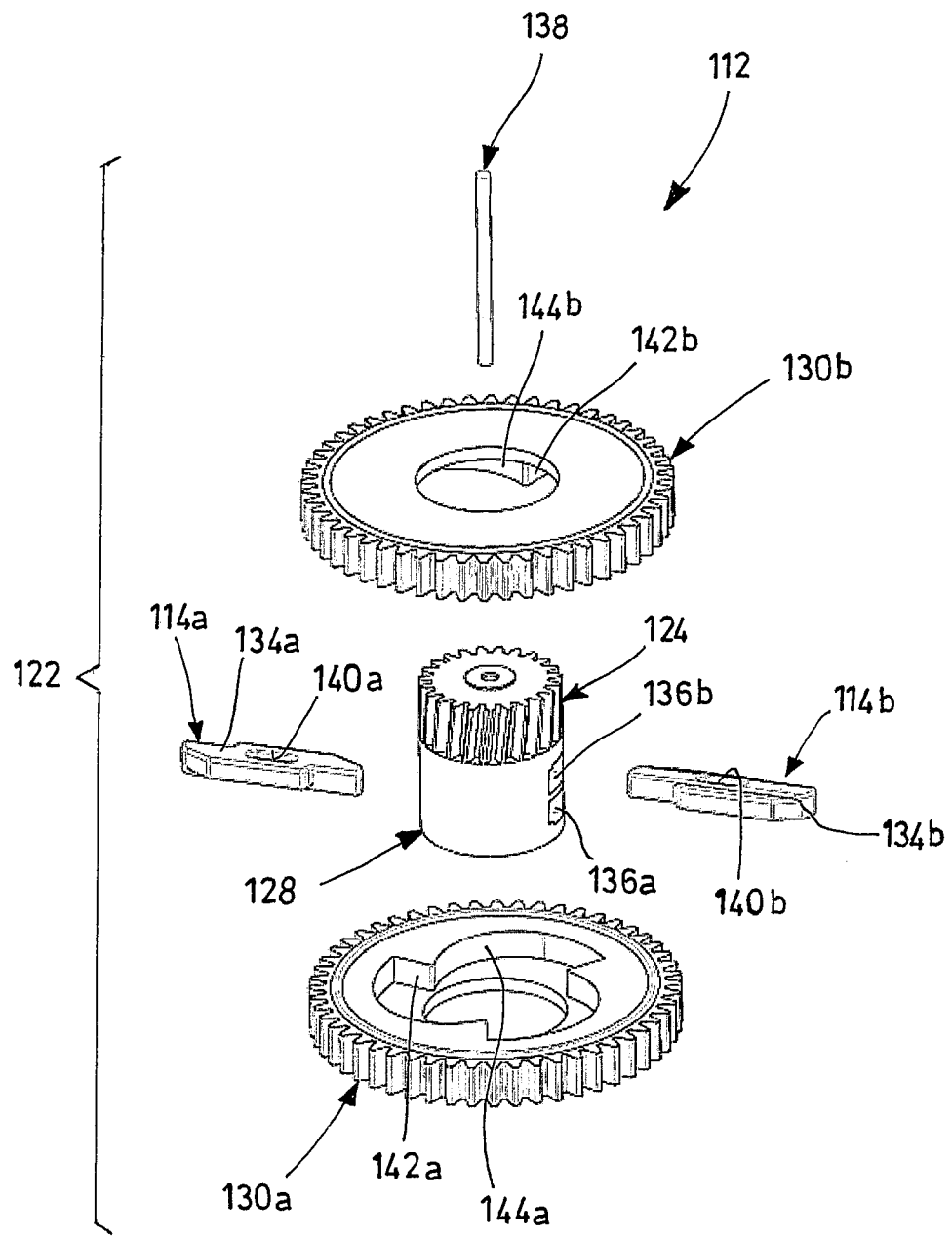
FIG. 8 is an exploded perspective view of a plurality of components belonging to the transmission mechanism shown in FIG. 7.
Figure 9:
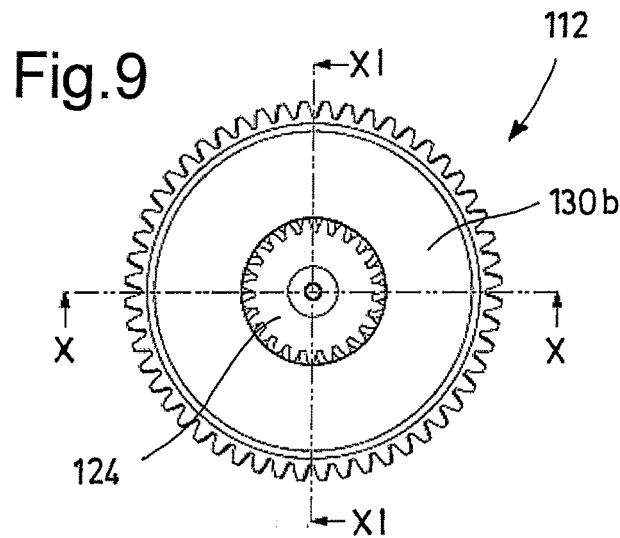
Figure 10:
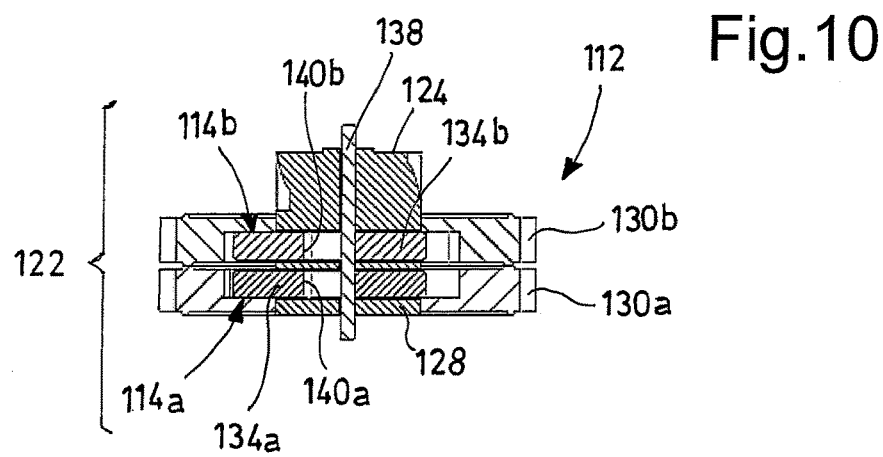
FIGS. 10 and 11 are sectional views, along the sectional lines X-X and XI-XI, respectively, of the assembled components shown in FIG. 9.
Figure 11:
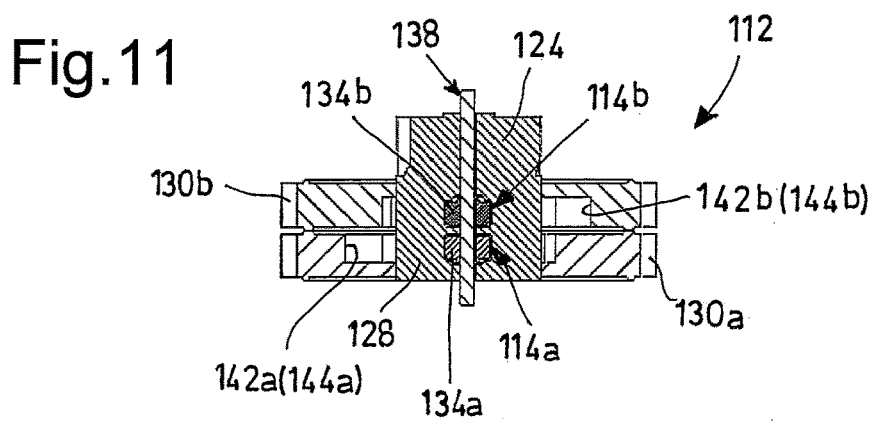

As can be appreciated in FIG. 1, drawer 10 is shown by way of example to be incorporated in a laundry washing machine M. As an alternative, the system may also be applied to a drawer of a different type of washing machine, e.g. a dishwasher.

In FIG. 1, in cabinet C a wash tub is defined, in which a drum or basket for containing the laundry to be washed (these items are not numbered) is rotatably supported. In particular, washing machine M is, by way of example, of the front-loading type, with a loading aperture whereto a door D is mounted (optionally provided with a glass window), hinged (in particular, vertically) to a front wall FW of cabinet C, through which the laundry can be introduced into the basket. However, the present invention can be used, without distinction, also in washing machines of different types, e.g. top-loading washing machines, possibly equipped with different doors.

In this embodiment, drawer 10 is mounted on front wall or face FW of cabinet C of washing machine M, e.g. above the wash tub (and hence above door D). However, as will be apparent to those skilled in the art, this position of drawer 10 should not be understood to limit the protection scope of the system of the present invention.

With particular reference to the embodiment shown by way of example in FIGS. 2 to 6, as aforementioned, system 100 preferably, but not necessarily, comprises an actuation device 102 and a control assembly 104 which can be separated from each other and which cooperate with each other.

Actuation device 102 is intended to be secured to fixed part or cabinet C (in this case, a drawer housing in which drawer 10 is slidably housed), and comprises a motor 106 (of which only output shaft 116 is visible in the drawings). Instead, control assembly 104 is intended to be secured to the movable part or drawer 10, so that it is movable therewith between a decoupled position and a coupled position relative to the actuation device 102.

In the illustrated embodiment, in order to bring control assembly 104 into the coupled position it is necessary to push drawer 10 in the direction of arrow A, in particular in such a way as to connect output shaft 116 of actuation device 102 to an input member 118 of control assembly 104, as will be described more in detail below.

Control assembly 104 preferably comprises a first and a second controlled apparatus, which can be controlled via activation of motor 100 according to predefined or selectable modes.

Advantageously but not necessarily, in the illustrated embodiment said first and second controlled apparatus comprise a first and a second duct 108a, 108b to be hydraulically connected to a first and a second receptacle 12a, 12b, respectively, of drawer 10. Each one of receptacles 12a, 12b is prearranged for receiving a respective quantity of washing agent. For example, the washing agent to be introduced into the first receptacle 12a may be a detergent, while the washing agent to be introduced into the second receptacle 12b may be a softener. However, as will be apparent to those skilled in the art, the washing agent to be contained in the two receptacles 12a, 12b may also be the same, e.g. a detergent (in particular, if the contents of receptacles 12a, 12b are respectively associated with an initial pre-wash step and a subsequent wash step).

Control assembly 104 further comprises a first and a second movable member, which can be rotated by motor 106, and which are adapted to interact with the first and second controlled apparatus (in this case, the first and the second duct 108a, 108b), respectively. In the illustrated embodiment, the above mentioned first and second movable members comprise a first and a second pumping member 110a, 110b, which can be rotated to push a first and a second dose of washing agent through the first and the second duct 108a, 108b, respectively out from the first and the second receptacle 12a, 12b.

Note that in further embodiments of the invention the control assembly may have no controlled apparatus, which may belong to an external structure and be afterwards operationally connected to the movable members while assembling the system. In such a case, the controlled apparatus will be external to the system.

With particular reference to FIGS. 7 to 13, control assembly 104 further comprises a transmission mechanism 112 configured for controlling pumping members 110a, 110b and coupled to or decoupled from, respectively, motor 106 when control assembly 104 is in the coupled position or in the decoupled position, respectively.

Motor 106 is of the bidirectional type and is configured for selectively rotating, through transmission mechanism 112, the first and the second pumping member 110a, 110b, respectively, when control assembly 104 is in the coupled position and motor 106 turns in a first and a second direction of rotation, respectively, opposite to each other.

Transmission mechanism 112 comprises a first and a second unidirectional clutch 114a, 114b selectively cooperating with motor 106 when control assembly 104 is in the coupled position. In particular, the first and second unidirectional clutches 114a, 114b rotate the first and the second pumping member 110a, 110b, respectively, when motor 106 turns in the first and in the second direction of rotation, respectively, and rotatably decouple motor 106 and the first and the second pumping member 110a, 110b, respectively, when said motor 106 turns in the second and in the first direction of rotation, respectively. In other words, unidirectional clutches 114a, 114 act in an opposite manner one another with motor 106 turning in either direction of rotation.

Due to these technical features, system 10 can separately control the operation of two independent movable members (in this case, two pumping members 110a, 110b) by using a single motor 106, without needing any additional devices or actuators. Actually, by simply controlling the direction of rotation (in particular, either clockwise or counterclockwise) of motor 106 it will be possible to select the activation of either movable member, solely because of the mechanical cooperation between transmission mechanism 112 and motor 106.

In particular, motor 106 is of the electric type.

Preferably, as will be described more in detail below, each one of ducts 108a, 108b cooperates with the respective pumping member 110a, 110b in a peristaltic manner.

In the illustrated embodiment, motor 106 comprises an output shaft 116, which can turn in the first and second directions of rotation, and which is configured for being coupled to transmission mechanism 112 when control assembly 104 is brought into the coupled position.

In particular, the first and second unidirectional clutches 114a, 114b selectively cooperate with output shaft 116 when control assembly 104 is in said coupled position. Therefore, the first unidirectional clutch 114a rotates the first pumping member 110a when motor 106 turns in the first direction of rotation, and rotatably decouples motor 106 from the first pumping member 110a when motor 106 turns in the second direction of rotation. Likewise, the second unidirectional clutch 114b rotates the second pumping member 110b when motor 106 turns in the second direction of rotation, and rotatably decouples motor 106 from the second pumping member 110b when motor 106 turns in the first direction of rotation.

In the illustrated embodiment, the decoupled position corresponds to an extracted position of drawer 10, wherein each receptacle 12a, 12b is accessible outside cabinet C and can receive the respective washing agent. On the contrary, the coupled position corresponds to a retracted position of drawer 10, wherein it is closed within cabinet or drawer housing C and can dispense the washing agent from receptacles 12a, 12b out of drawer 10 (more precisely, towards the wash tub).

In particular, the displacement of drawer 10 (and hence of the control assembly 104) relative to actuation device 102 occurs in a guided manner. In particular, this sliding action may correspond to a translational motion in a direction that—when in use—is substantially horizontal. Guided movements of a different kind may however be envisaged, e.g. a rotation or oscillation of drawer 10 relative to cabinet C.

As aforementioned, each one of ducts 108a, 108b is configured for communicating with the respective receptacle 12a, 12b on one side, and with the outside of drawer 10 on the other side, in particular towards the wash tub of washing machine M.

Motor 106 that drives pumping members 110a, 110b is adapted to be connected to an electronic control unit of the dishwashing machine.

In this way, system 10 can ensure a safe and reliable electric connection between motor 106 and the electronic control unit. In fact, every time drawer 10 switches between the coupled position and the decoupled position, said electric connection will not be substantially affected. As aforementioned, in this embodiment the movement of drawer 10 between the coupled position and the decoupled position requires only cooperation of pure mechanical nature between motor 106 and transmission mechanism 112.

In addition, electric insulation will be ensured between control assembly 104 and motor 106, in that the electrically conducting elements of motor 106 are located in a separate and inaccessible environment relative to ducts 108a, 108b and receptacles 12a, 12b.

A further advantage that can be achieved with the present invention is that in this way it is possible to allow drawer 10 to be easily and fully extracted from cabinet C, e.g. for cleaning or washing drawer 10, without worrying about preserving the integrity of any electrical connectors or contacts.

As can be noticed, each pumping member 110a, 110b is mounted integral with drawer 10 and can move therewith between the coupled position and the decoupled position, whereas the coupling and decoupling between actuation device 102 and control assembly 104 occurs between the corresponding transmission mechanism 112 and motor 106.

In the illustrated embodiment, output shaft 116 is configured for fitting in a removable manner into a matching input member 118 of transmission mechanism 112, wherein output shaft 116 engages with input member 118 when control assembly 104 is brought into the coupled (or retracted) position. In particular, output shaft 116 has a profiled section (e.g. multilobed or star-shaped) adapted to engage into a seat 120 having a complementary shape, and carried by input member 118 when control assembly 104 is brought into the coupled position.

In the illustrated embodiment, output shaft 116 and input member 118 turn about the same axis when rotation assembly 104 is in the coupled position.

With particular reference to FIGS. 8 to 13, input member 118 cooperates with a gear 122 that selectively controls the rotation of pumping members 110a, 110b by transferring the rotation to the first and the second pumping member 110a, 110b, respectively, through unidirectional clutches 114a, 114b when motor shaft 116 turns in the first direction of rotation and in the second direction of rotation, respectively.

In the illustrated embodiment, pumping members 110a, 110b turn about axes of rotation that are oriented parallel to a direction orthogonal to the axis of rotation of input member 118.

In this embodiment, the coupling between output shaft 116 and the respective seat 120 is effected in a cushioned manner. Preferably, seat 120 is torsionally supported, in particular thanks to a respective elastic member (not numbered) carried by input member 118. In this manner, particularly because of said torsional play, the coupling between output shaft 116 and respective seat 120 can be facilitated, even if their complementary shapes are not perfectly aligned when control assembly 104 is pushed into the coupled position.

In the illustrated embodiment, seat 120 is obtained on a bowl-shaped element (the shape of which is complementary to that of the respective output shaft 116), which is rotoidally housed and rotatable in the central position of input member 118 while still remaining torsionally constrained, in particular through the elastic element (e.g. an appropriately preloaded coil spring).

Preferably, gear 122 comprises a toothed pinion 124 that cooperates with a worm screw portion 126 carried by input member 118.

In the illustrated embodiment, toothed pinion 124 is mounted rotatably integral with a pin 128, around which first and second crown wheels 130a and 130b are rotatably supported through interposition of the unidirectional clutches 114a, 114b between pin 128 and crown wheels 130a, 130b.

In particular, pin 128 is coaxial to toothed pinion 124; for example, these parts may be made as one monolithic piece.

As will be described below, crown wheels 130a and 130b are caused to turn about pin 128 by the action exerted by unidirectional clutches 114a, 114b, depending on whether output shaft 116 (which in turn rotatably drives the assembly consisting of toothed pinion 124 and pin 128) rotates in the first direction of rotation or in the second direction of rotation.

Advantageously, toothed pinion 124 and associated pin 126 turn about the same axis of rotation oriented parallel to a direction orthogonal to the axis of rotation of input member 118.

Of course, crown wheels 130a, 130b rotate about the same axis of rotation as pin 128 around which they are rotatably supported.

In turn, preferably, the first and second crown wheels 130a, 130b engage at their periphery with first and second toothed wheels 132a, 132b, respectively, which are mounted rotatably integral with the first and second pumping members 110a, 110b, respectively. Crown wheels 132a and 132b are preferably located in diametrically opposite positions relative to crown wheels 130a and 130b.

In particular, the first and second crown wheels 132a, 132b are mounted coaxial to the first and second pumping members 110a, 110b, respectively.

More in detail, the first and second crown wheels 132a, 132b are rotatable about respective axes of rotation that are parallel to the axis of rotation of crown wheels 130a and 130b with which they mesh.

In the illustrated embodiment, unidirectional clutches 114a, 114b comprise first and second sliding rods 134a, 134b protruding through first and second diametric cavities 136a, 136b, respectively, of pin 128. Rods 134a, 134b are surrounded by the first and second crown wheels 130a, 130b, respectively, so as to selectively cooperate with respective shaped profiles of the first and second crown wheels 130a, 130b. In particular, as will be described more in detail below, the diametric sliding travel of rods 134a, 134b relative to pin 128 is limited.

In the illustrated embodiment, said diametric sliding is preferably determined by the following:

there is a central peg 138 mounted rotatably integral with pin 128 and crossing diametric cavities 136a and 136b, and each one of rods 134a, 134b has a respective slot 140a, 140b that houses said central peg 138 with relative sliding freedom in the diametric direction.

In particular, central peg 138 is mounted coaxial to pin 128.

As aforementioned, in the illustrated embodiment the ends of rods 134a, 134b are adapted to cooperate with the shaped profile of the inner cavity of crown wheels 130a, 130b. In particular, the shaped profile comprises an alternate sequence of support portions 142a (142b) and arched portions 144a (144b) following and joining each other. Preferably, each support portion 142 is substantially radial, whereas each arched portion 144 extends from the radially outermost terminal portion of the preceding support portion 142. Then arched portion 144 extends circumferentially with a gradual decrease of its radius of curvature, until it reaches the radially innermost initial portion of the next support portion 142.

In other words, the alternate arrangement of support portions 142a (142b) and arched portions 144a (144b) creates an internal circumferential profile which has a substantially "saw-tooth" shape.

Figure 14:
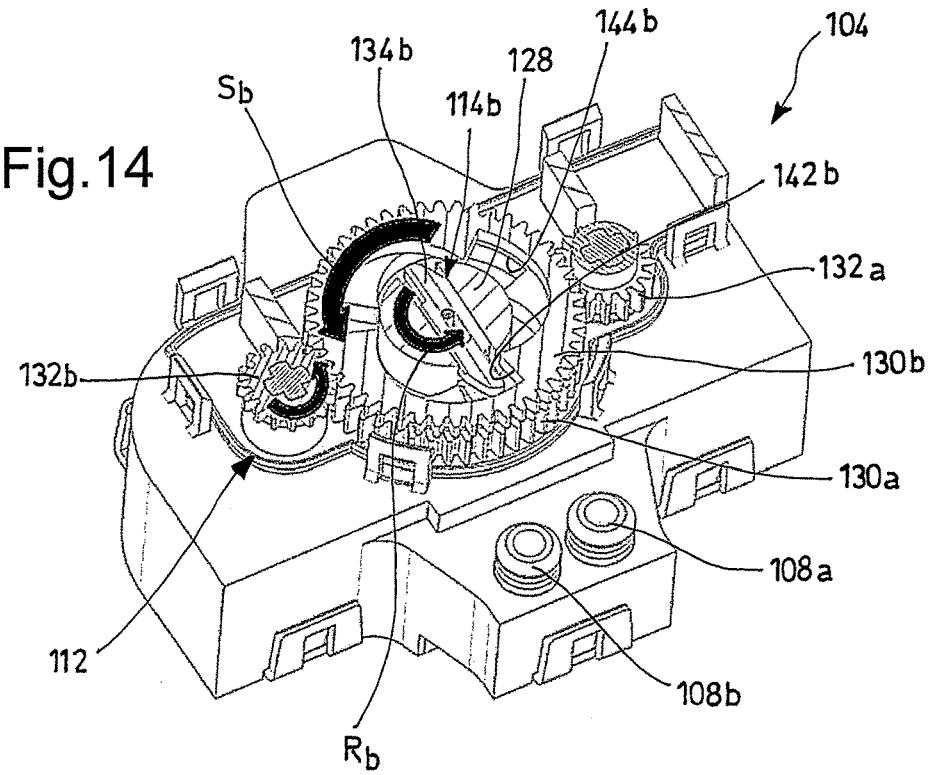
FIGS. 14 and 15 are partial views similar to that of FIG. 7, with the indication of two different modes of operation of the system shown in the preceding figures.
Figure 15:
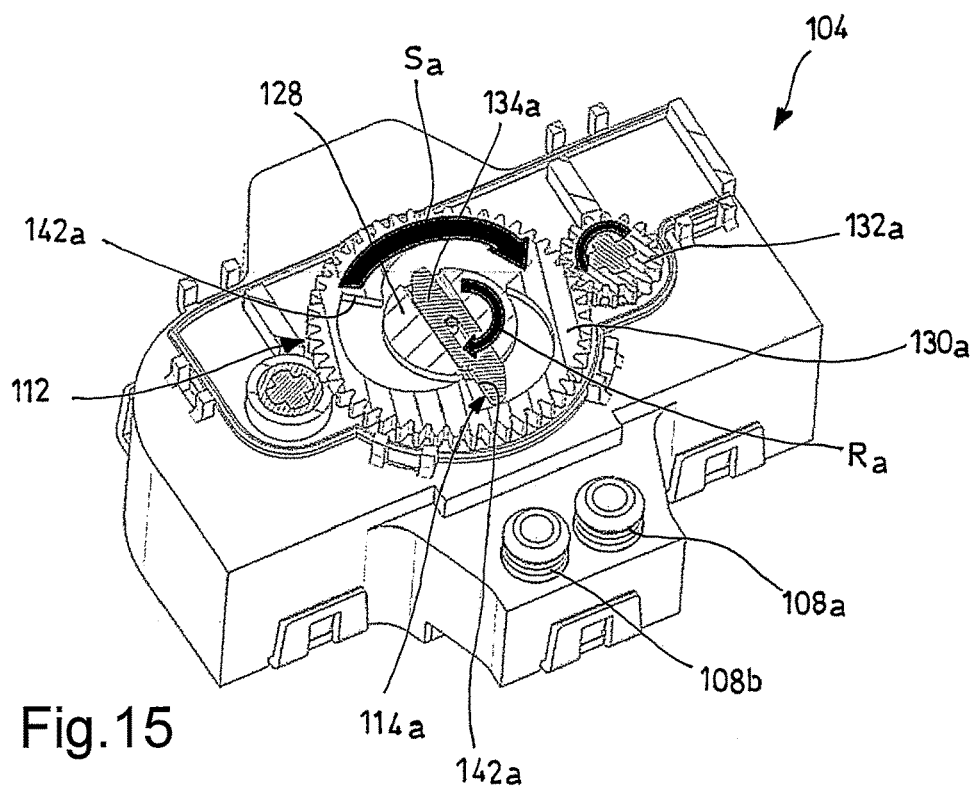

With particular reference to FIGS. 14 and 15, the following will illustrate the operation of gear 122 and of unidirectional clutches 114a and 114b associated therewith.

In the illustrated embodiment, during the rotation of pin 128 the ends of rods 134a, 134b cooperate with said shaped profile to rotatably control or release the respective crown wheels 130a, 130b, depending on whether pin 128 is turned in a first direction of rotation Ra (clockwise when viewing FIG. 15) or in a second direction of rotation Rb (counterclockwise when viewing FIG. 14).

By way of example, let us assume that the rotation of motor 106 (and of the associated output shaft 116) in the first direction of rotation corresponds to a transfer of torque to pinion 128 in the first direction of rotation Ra. Vice versa, let us assume that the rotation of motor 106 (and of the associated output shaft 116) in the second direction of rotation corresponds to a transfer of torque to pinion 128 in the second direction of rotation Rb.

In particular, when pin 128 is turned about its own axis in the first direction of rotation Ra (FIG. 15), the first rod 134a is caused to slide diametrically in a guided manner through pin 128, so that one of the ends of the first rod 134a will engage against a support portion 142a of a first shaped profile formed on the first crown wheel 130a. Thus, the first rod 134a will rotatably push the first crown wheel 130a (hence controlling the rotation of pumping member 110a, which will then dispense the first washing agent contained in the first receptacle 12a) in the direction of rotation indicated by arrow Sa, corresponding to the direction of rotation Ra (i.e. clockwise). Vice versa, the second rod 134b will be made to slide diametrically in a guided manner through pin 128, so that the ends of the second rod 134b can slide freely in contact with arched portions 144b, thus keeping pin 128 and the second crown wheel 130b rotatably released. Pumping member 110b will thus not be rotated and will not dispense the second washing agent contained in the second receptacle 12b.

In particular, when pin 128 is turned about its own axis in the second direction of rotation Rb, the second rod 130b is caused to slide diametrically in a guided manner through pin 128, so that one of the ends of the second rod 130b will engage against a support portion 142b of a second shaped profile formed on the second crown wheel 130b. Thus, the second rod 134b will rotatably push the second crown wheel 130b (hence controlling the rotation of pumping member 110b, which will then dispense the second washing agent contained in the second receptacle 12b) in the direction of rotation indicated by arrow Sb, corresponding to the direction of rotation Ra (i.e. counterclockwise). Vice versa, the first rod 134a will be made to slide diametrically in a guided manner through the pin 128, so that the ends of the first rod 134a can slide freely in contact with arched portions 144a, thus keeping pin 128 and the first crown wheel 130a rotatably released. Pumping member 110a will thus not be rotated and will not dispense the first washing agent contained in the first receptacle 12a.

As will be apparent to those skilled in the art, it is necessary to ensure that, when the ends of rods 134a, 134b are cooperating with the respective arched portions 144a, 144b, no rotation substantially occurs of the respective crown wheels 130a, 130b. In this regard, one side or face of the ends of rods 134a, 134b is preferably slightly bevelled, tapered or smoothed, in order to prevent any undesired engagement or abutment against arched portions 144a, 144b. Of course, the bevelling, tapering or smoothing shall be made on that part of the ends of rods 134a, 134b which, in operation, faces towards arched portion 144a, 144b.

Preferably, each one of ducts 108a, 108b comprises a deformable tube, and each pumping member 110a, 110b comprises a peristaltic rotor adapted to cooperate with the respective deformable tube for pushing the washing agent contained in the corresponding receptacle 12a, 12b out of the latter.

In the illustrated embodiment, each peristaltic rotor has a respective pair of protruding portions 146a, 146b, preferably located on diametrically opposite sides, adapted to be placed in contact with the walls of the respective duct 108a, 108b. In particular, said protruding portions 146a, 146b are adapted to create a local throttling in the deformable tube in order to cause the fluid contained therein to advance during the rotation of the peristaltic rotor. Preferably, at least one of said protruding portions 146a, 146b comprises a peripheral roller adapted to locally compress the deformable tube, resulting in the latter being throttled.

In this embodiment, each one of ducts 108a, 108b has a descending tract lower than the bottom of associated receptacle 12a, 12b, which ends into a substantially horizontal drain tract for expelling the washing agent into the wash tub.

In this embodiment, each pumping member 110a, 110b is rotatable about a vertical axis of rotation.

In this embodiment, actuation device 102 with motor 106 is mounted on the rear wall of cabinet or drawer housing C. More in detail, output shaft 116 protrudes in a substantially horizontal direction.

In this embodiment, transmission mechanism 122, ducts 108a, 108b, pumping members 110a, 110b are enclosed in a casing 148 (FIGS. 4 and 5) applicable to drawer 10 and including a pair of half-shells that can be snap-coupled together at their periphery. Preferably, the cavity defined by casing 148 is divided into a dispensation chamber (not numbered), which houses ducts 108a, 108b and pumping members 110a, 110b, and a transmission chamber (also not numbered), which houses transmission mechanism 122. The dispensation chamber and the transmission chamber are preferably separated from each other in a watertight manner, so as to ensure a reliable operation of system 100.

Furthermore, actuation device 102 comprises also a level sensor assembly 150 adapted to interface with a transparent region 152 suitably obtained in drawer 10 and facing towards receptacles 12a, 12b (or even towards just one of them), when control assembly 104 is in the coupled position.

In the illustrated embodiment, casing 148 of control assembly 104 is mounted, in particular, on a rear wall, or behind drawer 10.

More in detail, when installing casing 148, ducts 108a, 108b are connected by means of fittings (not numbered) to apertures provided in the bottom of drawer 10, so that ducts 108a, 108b and the associated pumping members 110a, 110b will remain under the bottom of drawer 10 (and hence under the level of the washing agent contained in receptacles 12a, 12b).

Figure 16:
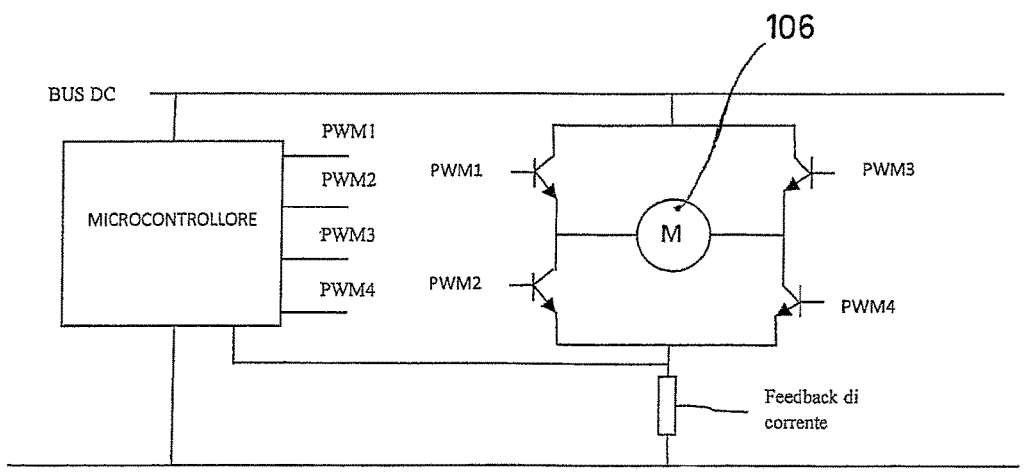

FIG. 16 shows an example of a control circuit suitable for controlling motor 106 in order to implement a bidirectional control thereof.

Power is supplied to motor 106 by a DC bus.

The revolution speed and direction of rotation of the motor are controlled through four electronic switching devices PWM1, PWM2, PWM3, PWM4 (e.g. transistor, IGBT, Mosfet, . . . ) controlled in PWM mode by a microprocessor.

In order to execute the correct command, the microprocessor makes use of a measurement of the motor current obtained via a current feedback circuit.

FIG. 17 shows another example of a control circuit suitable for controlling motor 106 in order to implement a bidirectional control thereof.

The motor is current controlled and is powered by the microcontroller through a triac.

Via the zero cross circuit, the triac is turned on synchronously with the mains half-waves.

The first half-wave, in accordance with the last half-wave with which the triac was turned off, will determine the direction of rotation of the motor.

The first half-wave is applied for its entire duration, whereas the next ones are limited to a time t which is proportional to the current feedback, so as to ensure the correct switching of the magnetic poles of the motor.

Of course, without prejudice to the principle of the invention, the forms of embodiment and the implementation details may be extensively varied from those described and illustrated herein by way of non-limiting example, without however departing from the scope of the invention as set out in the appended claims.

For example, as aforementioned, in system 100 there may be no separability between actuation device 102 and control assembly 104. In other words, the elements and components of the actuation device and the elements and components of the control assembly may even not be arranged on two reciprocally movable parts (such as the cabinet and the drawer mentioned in the present description). In such a case, the actuation device and the control assembly will not be able to take the coupled position and the decoupled position, but will remain operational in the coupled position, wherein the motor will stay constrained to and engaging with the transmission mechanism.

For example, due to operating requirements of the device whereto the system is applied, the mounting position of actuation device 102 and of control assembly 104 may be reversed between the movable part (which in the exemplary embodiment illustrated herein is drawer 10) and the fixed part (which in the exemplary embodiment illustrated herein is cabinet C).

For example, in further variant embodiments of the invention, the combination of duct 108a, 108b and pumping member 110a, 110b may differ from the peristaltic pump structure. In particular, the passage and the pumping member may be implemented in such a way as to form, as a whole, different pump structures, such as, by way of example, gear pumps, lobe pumps, vane pumps, screw pumps, etc.

The invention claimed is:

1. A system for controlling a pair of controlled apparatus in a household appliance; said system comprising:
   a motor;
   a first movable member and a second movable member, which can be rotated by said motor, and which are adapted to interact with a first controlled apparatus and a second controlled apparatus, respectively, and
   a transmission mechanism, configured for controlling said movable members;
   wherein said motor is bidirectional and is configured for selectively rotating, through said transmission mechanism, said first and second movable members, respectively, when said motor turns in a first direction and a second direction of rotation, respectively, opposite to each other; said transmission mechanism comprising a first unidirectional clutch and a second unidirectional clutch selectively cooperating with said motor.

2. A system according to claim 1, wherein said first and second unidirectional clutches rotate said first and second movable members, respectively, when said motor turns in said first and second directions of rotation, respectively, and disengage said motor from said first and second movable members, respectively, when said motor turns in said second and first directions of rotation, respectively.

3. A system according to claim 1, wherein said motor comprises an output shaft for cooperating with a corresponding input member of said transmission mechanism.

4. A system according to claim 3, wherein said input member cooperates with a gear that selectively controls rotation of said movable members through said unidirectional clutches.

5. A system according to claim 4, wherein said gear comprises a toothed pinion that cooperates with a worm screw carried by said input member.

6. A system according to claim 5, wherein said toothed pinion is mounted rotatably integral with a pin, around which first and second crown wheels are rotatably supported through interposition of said unidirectional clutches between said pin and said crown wheels.

7. A system according to claim 6, wherein said first and second crown wheels engage at a periphery with first and second toothed wheels, respectively, which are mounted rotatably integral with said first and second movable members, respectively.

8. A system according to claim 6, wherein said unidirectional clutches comprise first and second sliding rods protruding through first and second diametric cavities, respectively, of said pin 128; said rods being surrounded by the first and second crown wheels, respectively, so as to selectively cooperate with respective shaped profiles of said first and second crown wheels.

9. A system according to claim 8, further comprising a central peg mounted rotatably integral with said pin and crossing said diametric cavities; each one of said rods having a respective slot that houses said central peg with relative sliding freedom in a diametric direction.

10. A system according to claim 8, wherein each one of said shaped profiles comprises an alternate sequence of support portions and arched portions following and joining each other.

11. A system according to claim 1, further comprising first and second ducts hydraulically connected to first and second receptacles, respectively, for receiving first and second quantities of respective first and second fluidic agents; said first and second movable members consisting of first and second pumping members configured for pushing first and second doses of fluidic agents out of said first and second receptacles, respectively, through said first and second ducts, respectively.

12. A system according to claim 1, wherein said system is divided into an actuation device and a control assembly separable from each other and cooperating with each other; said actuation device and said control assembly being adapted to be secured to respective parts mutually movable between a decoupled position and a coupled position relative to said actuation device; said actuation device comprising said motor, and said control assembly comprising said first and second movable members and said transmission mechanism.

13. A system according to claim 12, wherein said transmission mechanism is coupled to said motor and decoupled from said motor, respectively, when said control assembly is in said coupled position and in said decoupled position, respectively.

14. A system according to claim 12, wherein said transmission mechanism is configured for rotating said first and second movable members, respectively, when said control assembly is in said coupled position, wherein said control assembly is coupled to said actuation device.

15. A system according to claim 1, wherein said motor is controlled through a plurality of electronic switching devices, controlled in pulse width modulation mode by a microprocessor.

16. A system according to claim 1, wherein said motor is current controlled and supplied by a microcontroller through a triac.

* * * * *

UNITED STATES PATENT AND TRADEMARK OFFICE
CERTIFICATE OF CORRECTION

PATENT NO. : 10,378,141 B2
APPLICATION NO. : 15/550279
DATED : August 13, 2019
INVENTOR(S) : Becchio et al.

Page 1 of 1

It is certified that error appears in the above-identified patent and that said Letters Patent is hereby corrected as shown below:

On the Title Page

(30) Foreign Application Priority Data: "Feb. 13, 2015 (IT) TO2015A0097" should read --Feb. 13, 2015 (IT) TO2015A000097--

Signed and Sealed this
Twelfth Day of November, 2019

Andrei Iancu
*Director of the United States Patent and Trademark Office*